(12) United States Patent
Cedergren

(10) Patent No.: US 6,837,257 B2
(45) Date of Patent: Jan. 4, 2005

(54) VALVE DEVICE AT DISPENSERS

(75) Inventor: Stefan Cedergren, Bunkeflostrand (SE)

(73) Assignee: Asept International AB, Lund (SE)

( * ) Notice: Subject to any disclaimer, the term of this patent is extended or adjusted under 35 U.S.C. 154(b) by 0 days.

(21) Appl. No.: 10/480,957

(22) PCT Filed: Jul. 3, 2002

(86) PCT No.: PCT/SE02/01315
§ 371 (c)(1),
(2), (4) Date: Dec. 8, 2003

(87) PCT Pub. No.: WO03/004402
PCT Pub. Date: Jan. 16, 2003

(65) Prior Publication Data
US 2004/0168720 A1 Sep. 2, 2004

(30) Foreign Application Priority Data
Jul. 4, 2001 (SE) .............................................. 0102396

(51) Int. Cl.[7] ............................ F16K 31/08; B67D 5/34
(52) U.S. Cl. ......................... 137/113; 137/907; 251/65
(58) Field of Search ............................... 137/113, 907; 251/65

(56) References Cited

U.S. PATENT DOCUMENTS

| | | | |
|---|---|---|---|
| 3,206,159 A | * | 9/1965 | Anderson et al. ............ 251/28 |
| 3,651,833 A | * | 3/1972 | Piko ...................... 137/625.65 |
| 4,275,823 A | | 6/1981 | Credle, Jr. |
| 4,603,793 A | | 8/1986 | Stern |
| 4,819,693 A | | 4/1989 | Rodder |
| 6,098,845 A | | 8/2000 | Stern |
| 6,173,729 B1 | * | 1/2001 | Dey et al. ................... 137/113 |

FOREIGN PATENT DOCUMENTS

| | | |
|---|---|---|
| EP | 0235437 A1 | 9/1987 |
| EP | 0905045 B1 | 3/1999 |
| WO | WO03004402 A1 | 1/2003 |

* cited by examiner

Primary Examiner—Ramesh Krishnamurthy
(74) Attorney, Agent, or Firm—Tarolli, Sundheim, Covell & Tummino L.L.P.

(57) ABSTRACT

The present invention relates to a valve device at dispensers which are adapted for dispensing portions of liquid or semi-liquid products (2), preferably foodstuff, from containers, and which have vacuum pumps (5) for generating a negative pressure in passage systems (6) through which the products (2) are dispensed from the containers. The valve device is a magnetic valve device (9) which is designed as a permanent magnet device with a valve body (9d) which automatically shifts or changes position when the vacuum pump (5) has emptied a container (e.g. 3), such that said vacuum pump (5) immediately thereafter can empty another container (e.g. 4).

28 Claims, 3 Drawing Sheets

VALVE DEVICE AT DISPENSERS

BACKGROUND OF THE INVENTION

The present invention relates to a valve device at dispensers which are adapted for dispensing portions of liquid or semi-liquid products, preferably foodstuff, from containers, and which dispensers have vacuum pumps for generating a negative pressure in passage systems through which the products are dispensed from the containers.

Dispensers for dispensing portions of foodstuff, e.g. ketchup, mustard or dressing, are used most intensively a few hours during the day, e.g. at lunch time. This means that the content in the containers from which the foodstuff is dispensed, is normally used up during said hours. The empty containers must then be replaced by full containers, which means that the dispensing must be interrupted for a while, prolonging the time of waiting for the customers. In the above case, you notice when the product in the container is used up, but in other cases you do not notice this and the dispensing goes wrong. Said latter case might occur when dispensing is to be carried through in milkshake machines, dishwashing machines or washing machines.

In U.S. Pat. No. 4,275,823 there is described a valve device which, when dispensing portions of liquid foodstuff, automatically closes a discharge passage when a container connected thereto is empty and opens another discharge passage for a full container connected thereto. At this valve device, the valve body is controlled by a spring, which is disadvantageous inter alia because the spring is difficult to clean.

In U.S. Pat. No. 4,819,693 there is described a valve device for controlling a gas flow. The valve body at this valve device is held in its two different positions by means of an electromagnet. For operating an electromagnet, connection to the electricity supply system is required, which, inter alia, for security reasons is not advisable at dispensing devices for liquid or semi-liquid products such as foodstuff.

The object of the present invention has been to eliminate said problems and this is arrived at by means of a valve device having the characterizing features of subsequent claim 1.

Since the valve device is a permanent magnet device, an appropriate construction from an economic and security point of view is obtained, which is particularly suitable for use in connection with dispensers for liquid or semi-liquid foodstuff.

The invention will be further described below with reference to the accompanying drawings, in which

DETAILED DESCRIPTION

Figure 1:
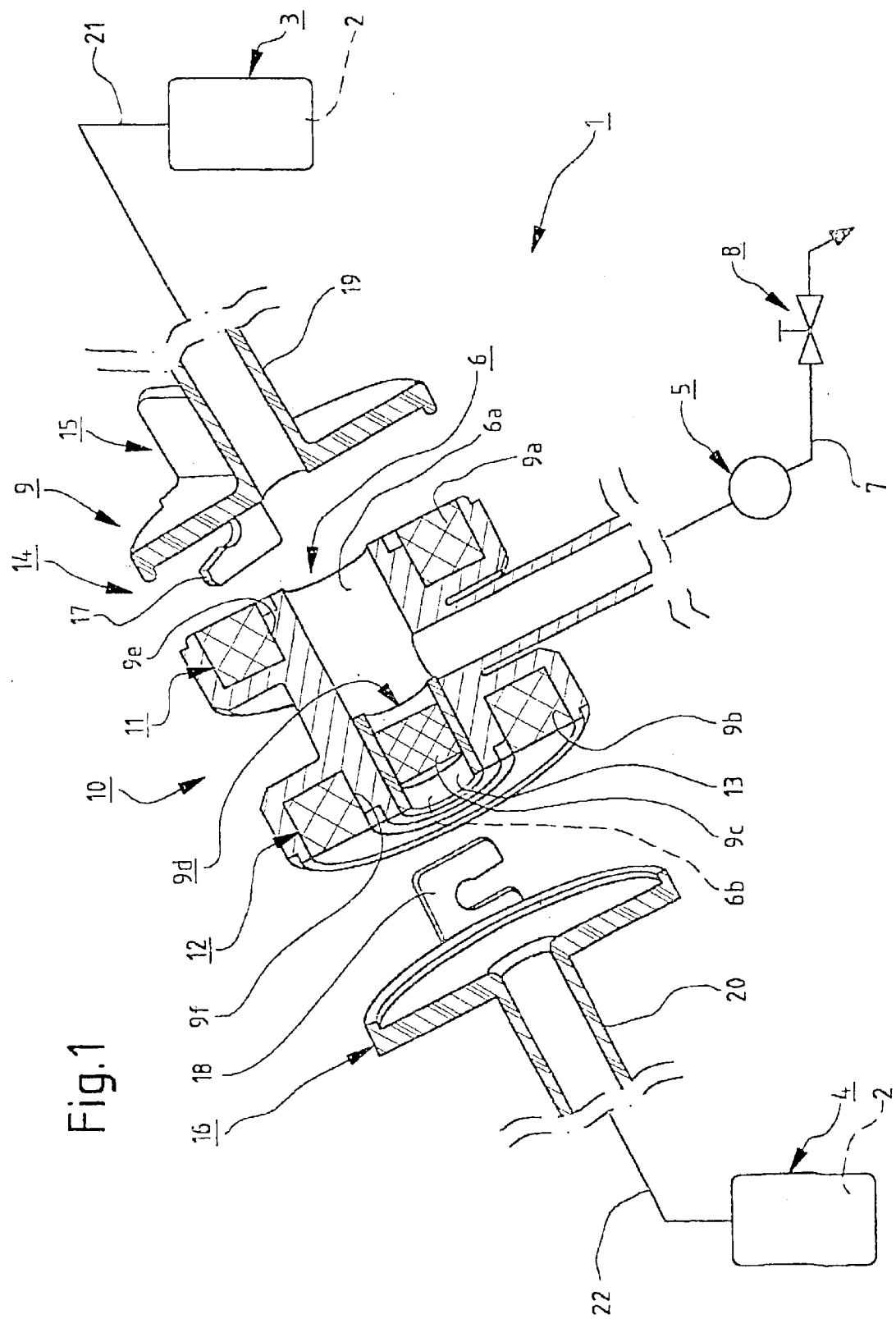
FIG. 1 is an exploded view of the valve device according to the invention for a dispenser, whereby members forming part thereof are shown in section.

The drawings illustrate a dispenser or dispensing device 1 for dispensing portions of liquid or semi-liquid products 2, preferably foodstuff, from two containers 3, 4. The foodstuff may e.g. be ketchup, mustard, dressing or similar. In order to perform said dispensing, the dispenser 1 includes at least one vacuum pump 5 which is manually operated or operated in another way, e.g. by electricity or pneumatically.

The vacuum pump 5 communicates with one container 3 and 4 respectively, at a time through first and second passages $6a$, $6b$ respectively, of a passage system 6 and it is provided to generate such a negative pressure (vacuum) in the respective container 3, 4 and in the passage system 6 that said product 2 is "sucked from" the respective container 3, 4 and through one of the passages $6a$ and $6b$ respectively, to the vacuum pump 5. The passage system 6 also includes a third passage $6c$ through with both passages $6a$, $6b$ communicate with the vacuum pump 5. The product 2 is dispensed therefrom through a tube 7 or a hose or similar provided with a cut-off valve 8.

The dispenser 1 also includes at least one valve device 9 which is adapted for controlling the dispensing such that the vacuum pump 5 first dispenses or discharges the product 2 portionwise from one of the containers 3 or 4 and when this is emptied on its content, discharges the product 2 from the other container 3 or 4. To accomplish this, the valve device is a magnetic valve device 9 which is designed as a permanent magnet device and which has at least three magnet means, namely a first magnet means $9a$ which is located in a certain definite position at the first passage $6a$, a second magnet means $9b$ which is located in a certain definite position at the second passage $6b$ and a third magnet means $9c$ which form part of or is provided in a valve body $9d$ which is movable between a first valve position L1 (shown with solid lines in FIG. 2) in the second passage $6b$ and a second valve position L2 (shown with broken lines in FIG. 2) in the first passage $6a$. The valve body $9d$ is adapted to keep the first passage $6a$ open for transport of the product 2 therethrough and the second passage $6b$ closed when it is located in the valve position L1. Also, the valve body $9d$ is adapted to keep the second passage $6b$ open for transport of the product 2 therethrough and the first passage $6a$ closed when it is located in the valve position L2.

By means of the magnetic fields M1 and M2, the magnet means $9c$ of the valve body $9d$ is subjected to retaining forces which see to that the valve body $9d$ remains in its respective valve position L1 or L2 when the vacuum pump 5 generates a negative pressure in the open passage $6a$ or $6b$ and the container 3 or 4 connected thereto for feeding the product 2 through said open passage $6a$ or $6b$, and this applies as long as the vacuum pump 5 has not emptied the container 3 or 4 in question. In more detail, each magnetic field M1 and M2 respectively, may exert retaining forces P1 and P2 respectively on the magnet means $9c$ of the valve body $9d$ which are greater than the forces trying to displace the valve body $9d$ from its valve positions L1, L2 due to the fact that a pressure differential is formed on opposite sides of the valve body $9d$ when the vacuum pump 5 generates a negative pressure in the passage $6a$ or $6b$ that is open during the transport of the product 2 through said open passage $6a$ or $6b$ as long as the container 3 or 4 in question is not empty.

When the container 3 or 4 from which the vacuum pump 5 feeds the product 2 is empty, the vacuum pump 5 increases the negative pressure therein and in the passage $6a$ or $6b$ to which it is connected. Hereby, said pressure differential on opposite sides of the valve body $9d$ increases until said pressure differential is so great that the valve body $9d$ is subjected to displacement forces F1 and F2 respectively, which are greater than said retaining forces P1 and P2 respectively. When this occurs, said displacement forces F1, F2 move or displace the valve body 9d from the present valve position in a direction towards the other valve position, which means that the passage previously closed for transport of the product 2 opens such that the vacuum pump 5 can generate a negative pressure in the previously closed passage for transport of the product 2 out of the second container when the first container is empty.

Figure 2:
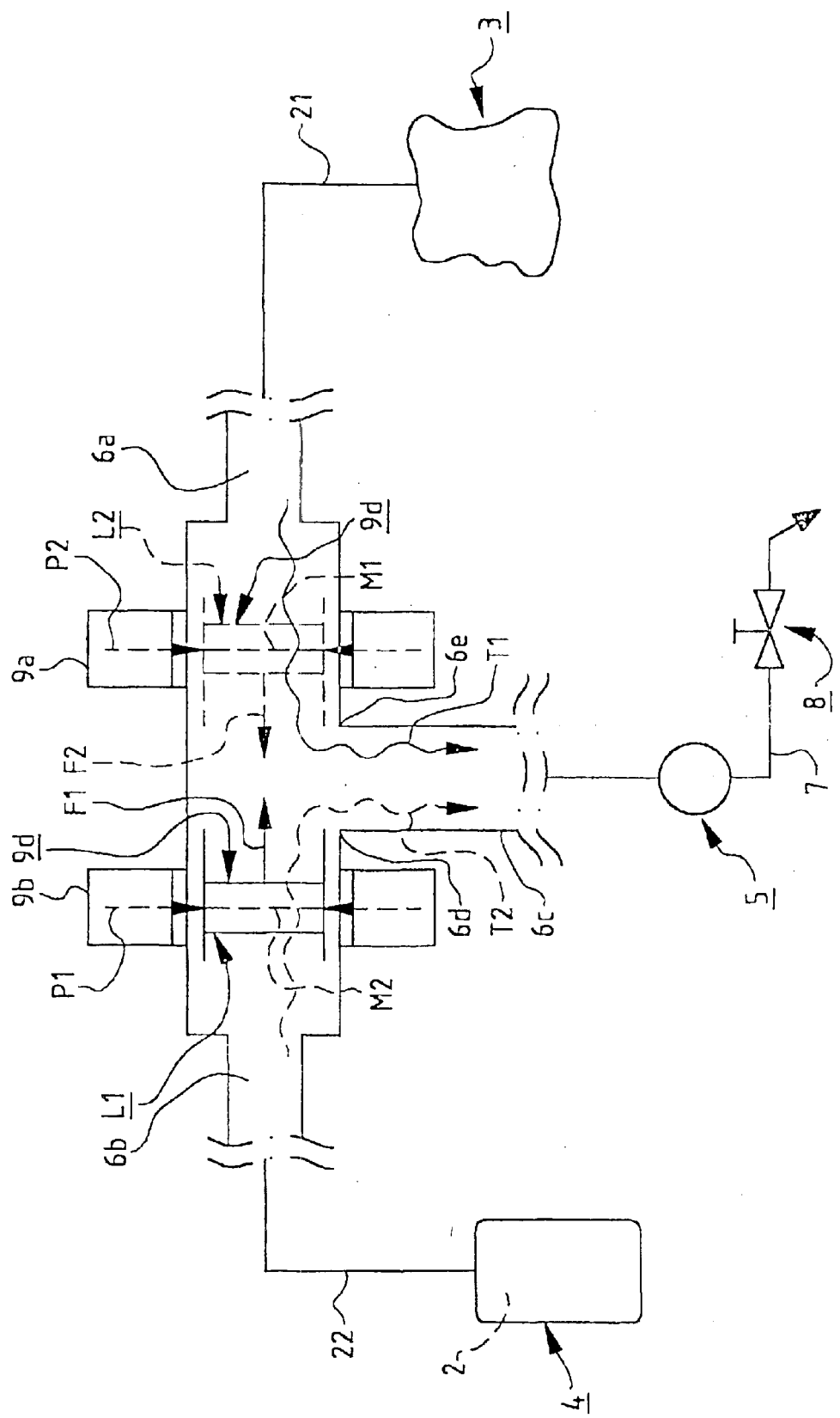
FIG. 2 schematically illustrates the valve device of FIG. 1 with the members thereof in different positions.

At the device illustrated in FIG. 2, said function is carried through in the following manner:

The magnet means 9c of the valve body 9d is retained, by the retaining forces P1 generated by the magnetic field M2, in the valve position L1 while the vacuum pump 5 is emptying the container 3 on the product 2 and transports or feeds it through the first passage 6a and the third passage 6c (in a direction illustrated with a solid line arrow T1) for dispensing through the tube 7.

When the container 3 is empty and preferably if it is closed against the atmosphere, the vacuum pump 5 increases the negative pressure in the first passage 6a, which means that the pressure differential on the downstream and upstream side of the valve body 9d increases, i.e. the displacement forces F1 increase. When the displacement forces F1 are greater than the retaining forces P1, the displacement forces F1 will move the valve body 9d from the valve position L1 in a direction towards the valve position L2 and at the end of this displacement, the magnet means 9c of the valve body 9d will preferably be attracted by the magnetic field M1 until the valve body 9d is situated in the valve position L2 in the first passage 6a. In said valve position L2, it is retained by the retaining forces P2 and in this valve position L2 the valve body 9d is shown with broken lines. Through said movement or displacement of the valve body 9d, the second passage 6b is opened, which means that the vacuum pump 5 can generate a negative pressure in said second passage 6b and in the container 4 for transport of the product 2 from said second container 4 after having emptied the first container 3. The product 2 is in said latter case transported from the second passage 6b to the third passage 6c (in a direction illustrated with a broken line arrow T2) and it is then dispensed through the tube 7.

When one of the containers 3 is empty, it can be replaced or exchanged for a container 4 with the product either during dispensing of the product 2 from the container 4 containing the product or when dispensing or discharge therefrom is not going on.

The relationship between the retaining forces P1 and P2 respectively, and the displacement forces F1 and F2 respectively, is preferably chosen such that the valve body 9d is moved from one valve position L1 to the other valve position L2 or vice versa immediately after the negative pressure increases in a passage 6a or 6b when the vacuum pump 5 has emptied the container 3 or 4 which is connected to said passage 6a or 6b so that no interruption or substantial interruption in the dispensing or discharge occurs when the vacuum pump 5 starts dispensing of the product 2 from the second container 4 when the first container 3 is empty.

The magnetic valve 9 is preferably provided to generate such a magnetic field M1 and M2 respectively, at each valve position L1 and L2 respectively, that when the valve body 9d is moved by the displacement forces F1 and F2 respectively, in a direction towards this magnetic field M1 and M2 respectively, said magnetic field will attract the valve body 9d in axial direction relative to the respective magnet means 9a, 9b during the last part of its movement such that it sets in the valve position L1 and L2 respectively, at the magnetic field M1 and M2 respectively, attracting the valve body 9d.

Since the magnetic valve device 9 is a permanent magnet device, complex systems for operating the magnetic valve device are avoided. The three magnet means 9a, 9b and 9c are consequently permanent magnet means. The first two magnet means 9a and 9b are preferably generating a magnetic force, while the third magnet means 9c,consisting or forming part of said valve body 9d, consists of a material which is affected by the magnet means 9a, 9b, generating a magnetic force, for generating said two magnetic fields M1 and M2.

The permanent magnet device 9 comprises a valve housing 10 including parts of the first, second and third passages 6a, 6b and 6c, whereby the parts of the first and second passages 6a, 6b preferably are aligned and open into the third passage 6c which is directed perpendicular or substantially perpendicular to the two other passages 6a, 6b.

The valve housing 10 defines a first space 11 for the first magnet means 9a which in this case is annular and which has an, in section, circular inner surface 9e which is centered with the part of the first passage 6a situated therewithin and preferably having a circular cross-sectional shape. The valve housing 10 further defines a second space 12 for the second magnet means 9b which in this case is also annular and having an inner surface 9f which in section is circular, said inner surface being centered with the part of the second passage 6b situated within said inner surface and preferably also having a circular cross-sectional shape.

The valve body 9d has in this case a cylindrical sleeve 13 of plastic material or another suitable material which preferably is non-magnetic. The size and shape of this sleeve 13 are adapted to the size and shape of the passages 6a, 6b such that the sleeve 13 can close the respective passage 6a, 6b when it is situated therein, so that the product 2 can not be brought to pass the sleeve 13 through the closed passage. In the present embodiment, the sleeve 13 has a circular exterior and its diameter is adapted to the diameter of the respective passage 6a, 6b such that the sealing therebetween is sufficient but there is no substantial friction when the valve body 9d moves between the valve positions L1 and L2.

The third magnet means 9c is provided inside the sleeve 13 and in the present embodiment it has a circular cross-sectional shape and is centered relative to the inner surfaces 9e and 9f respectively, of the first and second magnet means 9a and 9b respectively, when it is situated in the respective valve position L1 and L2. It is hereby ensured that the magnetic fields M1, M2 of the magnet means 9a, 9b can hold the valve body 9d in centered valve positions L1 and L2 respectively, relative to the passages 6a and 6b respectively, which means that the valve body 9d can be brought to "float" in the respective passage 6a, 6b in the respective valve position L1, L2 and it is thereby meant that the valve body 9d has an equally narrow gap around itself within the passage sides or engage eventually with the same hard pressure to the inner sides of the passages.

As is apparent from FIG. 1, parts of the passages 6a, 6b and 6c and the first and second space 11, 12 may be provided in one and the same unit 14. End pieces 15, 16 can be connectable to said unit 14 for closing the spaces 11, 12 and preferably for retaining the magnet means 9a, 9b therein. The end pieces 15, 16 may have coupling members 17, 18 for connection to the unit 14 and they may include tube members 19, 20 for connection thereto of hoses 21, 22. These hoses 21, 22 are in turn connectable to the containers 3, 4.

The magnet means 9a, 9b are preferably designed and mounted such that their retaining forces decrease immediately when the valve body 9d is displaced from the respective valve position L1, L2 by the respective displacement force F1, F2. Furthermore, the magnet means 9a, 9b may be designed such that they generate magnetic fields M1, M2 which are centrered therewith in axial direction, which means that the magnet means 9c of the valve body 9d is subjected to the greatest retaining forces P1 and P2 respectively, when the magnet means 9c is situated in positions which are centered with the respective magnet means 9a, 9b. The retaining forces P1 and P2 respectively, may be decreased when required by preventing the valve body 9d from location in said centered positions relative to the respective magnet means 9a, 9b, which means that only a part of the magnetic forces of the magnet means 9a, 9b is utilized. This might be of interest if the displacement forces F1, F2 generated by the vacuum pump 5 are too small relative to the retaining forces P1, P2 of the magnet means 9a, 9b.

The valve body 9d may be prevented from being situated in said centered positions relative to the respective magnet means 9a, 9b by locating an obstacle of some type in the first and second passage 6a, 6b respectively. Said obstacles may e.g. by defined by the end pieces 15, 16. Such a displaced valve position L1 is shown in FIG. 1.

The vacuum pump 5 can be provided to generate a negative pressure from a 30% vacuum in the passage system 6 and the respective container 3, 4 and the retaining forces P1, P2 can be selected such that the valve body 9d can be displaced or moved from its respective valve position L1, L2 at a negative pressure below the abovementioned negative pressure in the open passage 6a and 6b respectively.

The containers 3, 4 are preferably sealed against the atmosphere and they are preferably designed such that they can collapse when they are emptied because of the negative pressure generated therein by the vacuum pump 5. The containers 3, 4 may e.g. consist of thin-walled flexible material, e.g. consisting of or including plastic, i.e. they may be designed as plastic bags.

Figure 4:
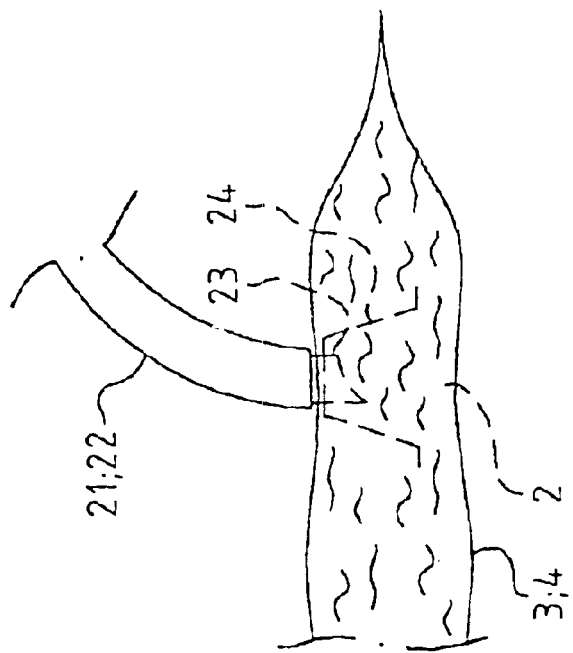
FIG. 4 schematically illustrates portions of the container of FIG. 3 with the coupling connected thereto.
Figure 3:
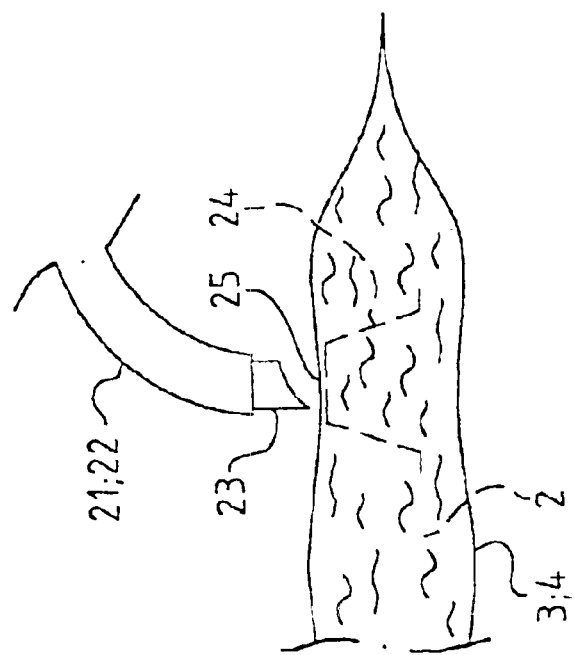
FIG. 3 schematically illustrates portions of a container which is adapted for emptying by means of the dispenser, and a coupling, connectable to the container, for a hose.

As is apparent from FIG. 3 and 4, each hose 21, 22 may have an outer coupling member 23 and each container 3, 4 an inner coupling member 24. The inner coupling member 24 may be located within a sealed wall portion 25 inside the for the rest also completely sealed container 3, 4. The hoses 21 and 22 respectively, can be connected to the containers 3 and 4 respectively, by pushing the outer coupling members 23 of said hoses 21, 22 through the sealed wall portion 25. The outer coupling member 23 is also pushed into the inner coupling member 24 until it is fixed therein and thereby, the respective container 3, 4 has been opened and the respective hose 21, 22 connected thereto such that its product 2 can flow out of the container 3 or 4 and through the coupling members 24, 23 into the respective hose 21, 22. It should be mentioned that coupling devices of this or similar type are known from U.S. Pat. No. 4,603,793 or EP 0 905 045 (=U.S. Pat. No. 6,098,845).

When the first container 3 is empty and the valve body 9d displaced from valve position L1 to valve position L2, the vacuum pump 5 will be able to empty the second container 4, whereby the product 2 will flow in direction T2 through the second passage 6b. Since the valve body 9d in valve position L2 closes the first passage 6a, the first empty container 3 can be replaced by a full container 3 and this can be done during dispensing of the product 2 from the second container 4 or during an interruption of said dispensing or discharge. When the second container 4 is empty, the valve body 9d will again be brought to leave the valve position L2 and return to valve position L1 such that the empty second container 4 can be exchanged for a full container 4 and so on.

The invention is not limited to the embodiment of the invention described above, but may vary within the scope of the following claims. Thus, it should be mentioned that instead of the two fixed magnet means 9a, 9b generating magnetic forces, the movable magnet means 9c can generate a magnetic force and the other magnet means 9a, 9b then be affected by said magnetic force.

There may be more than two containers 3, 4 and independent of the number of containers, these may be of other types than those illustrated and described above.

Regarding the product 2 in the containers 3, 4 it should be mentioned that it may be liquid or semi-liquid foodstuff such as ketchup, mustard, sauces, drinks or flavours or concentrates thereof. The product 2 however, may also be another product than foodstuff, e.g. cleaning liquids or concentrates thereof.

When required, containers 3, 4 with different products 2 may be used instead of containing the same product.

Finally, it should be mentioned that the valve body 9d, when moving between its valve positions L1, L2, may cooperate with corners 6d, 6e in the passage system 6 where the passages 6a, 6b from the containers 3, 4 open into the passage 6c connecting said passages 6a, 6b with the vacuum pump 5, such that solid particles included in the product 2 are cut by the valve body 9d in cooperation with said corners 6d, 6e.

What is claimed is:

1. Valve device at dispensers which are adapted for dispensing portions of liquid or semi-liquid products (2), preferably foodstuff, from containers, and which have vacuum pumps (5) for generating a negative pressure in passage systems (6) through which the products (2) are dispensed from the containers, characterized in that the valve device is a magnetic valve device (9) which is designed as a permanent magnet device which is provided to generate two magnetic fields (M1, M2) for providing retaining forces (P1, P2) for retaining a valve body (9d) in a valve position (L2) in a passage (6a) in the passage system (6) between a first container (3) and the vacuum pump (5) or another valve position (L1) in another passage (6b) in the passage system (6) between a second container (4) and the vacuum pump (5), that the valve body (9d) is movable or displaceable between said two valve positions (L2, L1) for keeping one of the passages (6a or 6b) open and the other passage (6a or 6b) closed, and that the vacuum pump (5) is provided to increase the pressure in an open passage (6a) when the container (3) connected thereto is empty and thereby generate such a pressure differential on opposite sides of the valve body (9d) that said valve body (9d) is subjected to displacement forces (F1 or F2) which are greater than the retaining forces (P1 or P2) for moving or displacing it from one valve position (L1) to the other valve position (L2) or vice versa and thereby opening a closed passage (6b or 6a) such that the vacuum pump (5) can bring the product (2) to flow from a second container (4) containing the product (2) to flow from a second container (4) containing the product (2) when the other (3) of said containers (3, 4) is empty.

2. Valve device according to claim 1, characterized in that the valve body (9d) in the first valve position (L1) in the second passage (6b) keeps a first passage (6a) open for permitting the vacuum pump (5) to generate a negative pressure in said first passage (6a) in order to bring the product (2) to flow from a first container (3) through said first passage (6a) so that the product (2) can be dispensed in portions from said first container (3), and that the valve body (9d) in the second valve position (L2) in the first passage (6a) keeps a second passage (6b) open for permitting the vacuum pump (5) to generate a negative pressure in said second passage (6b) in order to bring the product (2) to flow from a second container (4) through said second passage (6b) so that the product (2) can be dispensed in portions from said second container (4).

3. Valve device according to claim 1, characterized in that the relationship between the retaining forces (P1 and P2 respectively) and the displacement forces (F1 and F2 respectively) is chosen such that the valve body (9d) is moved from one valve position (L1) to the other valve position (L2) or vice versa immediately after the negative pressure increases in a passage (6a or 6b) when the vacuum pump (5) has emptied the container (3 or 4) connected to said passage (6a or 6b) such that no interruption or substantial interruption in the dispensing or discharge occurs when the vacuum pump (5) starts dispensing of the product (2) from a container (4) when another container (3) is empty.

4. Valve device according to claim 1, characterized in that the magnetic valve device (9) is provided to generate such a magnetic field (M1 and M2 respectively) at each valve position (L1 and L2 respectively) that when the valve body (9d) is moved by the displacement forces (F1 and F2 respectively) in a direction towards this magnetic field (M1 and M2 respectively), said magnetic field will attract the valve body (9d) during a last part of its movement such that it sets in the valve position (L1 and L2 respectively) at the magnetic field (M1 and M2 respectively) attracting the valve body (9d).

5. Valve device according to claim 1, characterized in that the valve body (9d) is provided to be moved or displaced in a direction from a first valve position (L1) to a second valve position (12) when a first container (3) is empty and in the opposite direction when a second container (4) is empty.

6. Valve device according to claim 1, characterized in that an empty container (e.g. 3) is exchangeable for a container (e.g. 4) containing the product (2) when the valve body (9d) closes the passage (e.g. 6a) between the empty container (e.g. 3) and the vacuum pump (5).

7. Valve device according to claim 6, characterized in that an empty container (3 or 4) is exchangeable for a container (4 or 3) containing the product (2) during dispensing by means of the vacuum pump (5) from the container (3 or 4) containing the product (2).

8. Valve device according to claim 1, characterized in that the magnet valve device (9) comprises at least three magnet means (9a, 9b, 9c) of which a first magnet means (9a) is located in a certain definite position relative to a first passage (6a) and a second magnet means (9b) is located in a certain definite position relative to a second passage (6b), while the third magnet means (9c) defines or forms part of the valve body (9d), that, the third magnet means (9c) of the valve body (9d) generates a magnetic field (M1) together with the first magnet means (9a) when the valve body (9d) is situated in a first valve position (L1) for keeping said first passage (6a) open and said second passage (6b) closed, and that the third magnet means (9c) of the valve body (9d) generates a second magnetic field (M2) together with the second magnet means (9b) when the valve body (9d) is situated in a second valve position (L2) for keeping said second passage (6b) open and said first passage (6a) closed.

9. Valve device according to claim 8, characterized in that the magnet means (9a and 9b) are designed and mounted such that their retaining forces (P1, P2) immediately reduce their influence or effect on the valve body (9d) when said valve body (9d) is displaced by the respective displacement force (F1, F2) from its respective valve position (L1, L2) in an axial direction relative to the respective magnet means (9a, 9b).

10. Valve device according to claim 8, characterized in that the first and second magnet means (9a and 9b) are provided to generate magnetic forces and that the third magnet means (9c) of the valve body (9d) consists of or includes a material which is affected by the magnetic forces of the first and second magnet means (9a, 9b).

11. Valve device according to claim 8, characterized in that the first and second magnet means (9a and 9b respectively) located in certain definite positions relative to the respective passage (6a, 6b) are annular, have circular inner surfaces (9e and 9f respectively) and are centered with such parts of the respective passage (6a, 6b) which have circular cross-sectional shapes, and that the third valve means (9c) of the valve body (9d) has a circular cross-sectional shape and is centered relative to the respective inner surface (9e, 9f) of the respective magnet means (9a, 9b) when the magnet means (9c) is situated in the respective valve position (L1, L2) in the respective passage (6a, 6b), such that the respective magnetic field (M1, M2) can retain the magnet means (9c) of the valve body (9d) in centered valve positions (L1 and L2 respectively) relative to the respective magnet means (9a, 9b).

12. Valve device according to claim 11, characterized in that each passage (6a and 6b respectively) has a circular cross-sectional shape within the respective magnet means (9a, 9b), that the outer side of the valve body (9d) has a corresponding circular cross-sectional shape and that the diameters of the respective (6a, 6b) and the valve body (9d) are adapted to each other such that sufficient sealing is provided between the valve body (9d) and the respective passage (6a, 6b) but no substantial friction therebetween when the valve body (9d) moves in the respective passage (6a, 6b).

13. Valve device according to claim 11, characterized in that the valve body (9d) has a sleeve (13) in which the magnet means (9c) of the valve body (9d) is provided and the outer side of which is located in sealing position relative to an inner side of the respective passage (6a, 6b) when the valve body (9d) is set in the respective valve position (L2, L1) therein.

14. Valve device according to claim 1, characterized in that the passage system (6) comprises three passages (6a, 6b, 6c) of which two passages (6a, 6b) open into a third passage (6c) for bringing the product (2) to flow to said third passage (6c) which is adapted to feed the product (2) further to the vacuum pump (5).

15. Valve device according to claim 14, characterized in that the valve body (9d), when moving between its valve positions (L1, L2), cooperates with corners (6d, 6e) in the passage system (6) where the passages (6a, 6b) from the containers (3, 4) open into the passage (6c) connecting said passages (6a, 6b) with the vacuum pump (5) such that if solid particles are included in the product (2), said solid particles are cut by the valve body (9d) in cooperation with said corners (6d, 6e).

16. Valve device according to claim 1, characterized in
that those parts of the passages (6a, 6b) in which the valve body (9d) of the magnetic valve device (9) can be set in its valve positions (l1, L2) and move therebetween, and a passage (6c) which connects said passages (6a, 6b) with the vacuum pump (5), are provided in a unit (14),
that said unit (14) defines spaces (11, 12) for magnet means (9a, 9b) which are located in certain definite positions relative to the respective passage (6a, 6b), and
that end pieces (15, 16) can be connected to said unit (14), by means of which end pieces (15, 16) said spaces (11, 12) for the magnet means (9a, 9b) can be closed.

17. Valve device according to claim 1, characterized in that the valve body (9d) is defined by or includes a magnet means (9c) which in the valve positions (l1, L2) of the valve body (9d) is situated in positions which are centered in axial direction relative to magnet means (9a and 9b respectively) with certain definite positions, whereby the retaining forces (P1 and P2 respectively) of the magnetic valve device (9) are greatest in said centered positions.

18. Valve device according to claim 1, characterized in that means (15, 16) are provided to prevent a magnet means (9c) of the valve body (9d) from being located in centered positions in axial direction relative to magnet means (9a and 9b respectively) having certain definite positions, whereby it is prevented that the magnet means (9c) of the valve body (9d) can be set or located in positions where the magnet means (9a and 9b respectively) generate their greatest retaining forces (P1 and P2 respectively) for accomplishing that the magnetic valve device (9) operates with less than maximum retaining forces (P1, P2).

19. Valve device according to claim 18, characterized in that said means (15, 16) are located in the respective passage (6a, 6b) such that they prevent the valve body (9d) from being set in said centered positions.

20. Valve device according to claim 1, characterized in that the vacuum pump (5) is provided to generate a negative pressure from 30% vacuum in the passage system (6) and the respective container (3, 4) and that the retaining forces (P1 and P2 respectively) are chosen such that the valve body (9d) is moved or displaced from its respective valve position (L1, L2) at a negative pressure in the open passage (6a and 6b, respectively) below said first negative pressure.

21. Valve device according to claim 1, characterized in that the containers (3, 4) are sealed against the atmosphere.

22. Valve device according to claim 1, characterized in that the containers (3, 4) are designed such that they can collapse when they are emptied on the product (2) by means of the vacuum pump (5).

23. Valve device according to claim 1, characterized in that the containers (3, 4) consist of thin-walled flexible material.

24. Valve device according to claim 23, characterized in that the containers (3, 4) consist of or include thin-walled, flexible plastic material.

25. Valve device according to claim 1, characterized in that passages (6a, 6b) for the product (2) are defined by or include hoses (21, 22) or similar, that each hose (21 and 22 respectively) has an outer coupling member (23), that each container (3 and 4 respectively) has an inner coupling member (24) which is located within a sealed wall portion (25) of the container (3 and 4 respectively) and that each hose (21 and 22 respectively) and container (3 and 4 respectively) can be interconnected by pushing the outer coupling member (23) of the hose (21 and 22 respectively) through the sealed wall portion (25) of the container (3 and 4 respectively) and connecting it to the inner coupling member (24) of said container (3 and 4 respectively).

26. Valve device according to claim 1, characterized in that the product (2) is ketchup, mustard, sauces, drinks or flavours or concentrates thereof.

27. Valve device according to claim 1, characterized in that there is the same type of product (2) in both containers (3 and 4).

28. Valve device according to claim 1, characterized in that there is one type of product (2) in one of the containers (3 or 4) and another type of product (2) in the other container (4 or 3).

* * * * *